United States Patent [19]
Mahakul et al.

[11] Patent Number: 5,868,112
[45] Date of Patent: Feb. 9, 1999

[54] DEEP ANGLE INJECTION NOZZLE AND PISTON HAVING COMPLEMENTARY COMBUSTION BOWL

[75] Inventors: Budhadeb Mahakul, Columbus; David A. Bolis, Nashville; George E. Crane, Columbus, all of Ind.

[73] Assignee: Cummins Engine Company, Inc., Columbus, Ind.

[21] Appl. No.: 770,145

[22] Filed: Dec. 19, 1996

[51] Int. Cl.$^6$ .................................................. F02B 31/00
[52] U.S. Cl. ........................................................... 123/263
[58] Field of Search ................................. 123/263, 41.35, 123/193.1, 193.5, 193.6, 262, 73 C, 74 R, 276, 260; 92/186, 196, 212

[56] References Cited

U.S. PATENT DOCUMENTS

| | | | |
|---|---|---|---|
| 1,865,841 | 7/1932 | Cummins | 123/262 |
| 2,709,992 | 6/1955 | Graves et al. | 123/263 |
| 3,020,900 | 2/1962 | Hoffmann | 123/263 |
| 3,508,531 | 4/1970 | Squinto et al. | 123/262 |
| 3,805,677 | 4/1974 | Clary et al. | 123/263 |
| 4,056,044 | 11/1977 | Kamman et al. | 92/159 |
| 4,161,165 | 7/1979 | Belush et al. | 123/193.1 |
| 4,180,027 | 12/1979 | Taylor | 123/41.36 |
| 4,242,948 | 1/1981 | Stang et al. | 92/212 |
| 4,286,505 | 9/1981 | Amdall | 92/186 |
| 4,377,967 | 3/1983 | Pelizzoni | 92/186 |
| 4,662,319 | 5/1987 | Ayoul | 123/41.35 |
| 4,759,323 | 7/1988 | August | 123/263 |
| 4,781,159 | 11/1988 | Elsbett et al. | 123/143.6 |
| 4,909,132 | 3/1990 | Kling et al. | 92/190 |
| 4,989,559 | 2/1991 | Fletcher-Jones | 123/193.6 |
| 5,000,144 | 3/1991 | Schweinzer et al. | 123/263 |
| 5,020,485 | 6/1991 | Watanabe | 123/73 C |
| 5,029,563 | 7/1991 | Guodong | 123/262 |
| 5,040,454 | 8/1991 | Ballheimer et al. | 92/177 |
| 5,121,722 | 6/1992 | Horiuchi | 123/263 |
| 5,299,738 | 4/1994 | Gester et al. | 239/91 |
| 5,305,720 | 4/1994 | Ando et al. | 123/193.4 |
| 5,320,075 | 6/1994 | Regueiro | 123/263 |
| 5,322,042 | 6/1994 | Di Priolo et al. | 123/263 |
| 5,445,323 | 8/1995 | Perr et al. | 239/91 |
| 5,555,867 | 9/1996 | Freen | 123/260 |

FOREIGN PATENT DOCUMENTS

| | | | |
|---|---|---|---|
| 0 589 178 A1 | 3/1994 | European Pat. Off. | |
| 1217467 | 5/1960 | France | 239/91 |

(List continued on next page.)

OTHER PUBLICATIONS

D. A. Pierpont and R. D. Reitz; Effects of Injection Pressure and Nozzle Geometry on D.I. Diesel Emissions and Performance; International Congress and Exposition, Detroit, Michigan, Feb. 27–Mar. 2, 1995.

C.G.A. Rosen; "Future Developemnts in Commercial Vehicle Engines"; Automotive Industries, Oct. 15, 1952.

*Primary Examiner*—Raymond A. Nelli
*Attorney, Agent, or Firm*—Sixbey, Friedman, Leedom & Ferguson; Charles M. Leedom, Jr.; Helen C. Kwok

[57] ABSTRACT

A piston for reciprocal movement within a combustion chamber (4) of a compression ignition engine (2) having a fuel injector (20) for forming a fuel injection plume (40) having a relatively deep angle (7° to 40° from a plane perpendicular to the central axis of the combustion chamber) and a piston (8) having a centrally located symmetrical upwardly opening cavity for forming a combustion bowl (30) especially arranged to complement the plume in a manner to maintain very low entrainment of soot in the lubrication oil of the engine and to maintain other engine emissions, e.g., CO and smoke, within acceptable ranges suitable to meet TALuft standards. In particular, the combustion bowl (30) as formed by an upwardly opening cavity formed as a surface of revolution having a centrally raised floor section (42) with relatively large radius of curvature $R^1$ and an upwardly flared outer bowl section 48 having relatively smaller radius of curvatures $R_2$. The ratio of $R_2$ divided by $R_1$ is greater than 0.14 and less than or equal to 0.32. Other important dimensional relationships would apply.

50 Claims, 7 Drawing Sheets

FOREIGN PATENT DOCUMENTS

| | | | |
|---|---|---|---|
| M 17120 | 1/1953 | Germany . | |
| 1 301 657 | 10/1967 | Germany . | |
| 1588 06 | 3/1981 | Germany . | |
| 0 071 994 | 8/1982 | Germany . | |
| 56106022 | 8/1981 | Japan . | |
| 59-155551 | 4/1984 | Japan | 123/262 |
| 60-135651 | 7/1985 | Japan | 123/263 |
| 40431651 | 2/1992 | Japan . | |
| 06346736 | 12/1994 | Japan . | |
| 1107870 | 12/1982 | Russian Federation . | |
| 713637 | 8/1954 | Switzerland | 239/91 |
| 465656 | 5/1937 | United Kingdom | 239/91 |
| 2 075 147 | 3/1981 | United Kingdom | 123/263 |
| 2 079 851 | 6/1981 | United Kingdom | 123/262 |
| WO 94/27041 | 11/1994 | WIPO | 239/91 |

DEEP ANGLE INJECTION NOZZLE AND PISTON HAVING COMPLEMENTARY COMBUSTION BOWL

BACKGROUND OF THE INVENTION

1. Field of Invention

This invention relates to an injection nozzle and piston designed for use in a compression ignition (diesel) internal combustion engine.

2. Description of Related Art

Internal combustion engine designers continue to confront an ever more demanding set of governmentally mandated emissions standards and performance objectives. Modifications made to meet one standard or improve engine performance may lead to increased emissions of a type that cause another standard to be exceeded. Thus, designers are often confronted with not only the challenge of meeting a desired performance objective or a newly imposed emission standard but to do so in a way that does not cause other emissions standards, previously met or newly imposed, to be exceeded.

An example of the difficulties created for engine designers is that created by a new set of diesel engine standards, known as TALuft, that have been promulgated for application in the European market. These standards require the diesel engine to operate below the following limits at all engine operating points based upon a fuel consumption greater than 552 pounds per hour:

$NO_x$ 2 grams/$M^3$

Carbon Monoxide 650 mg/$M^3$

Unburnt Hydrocarbon (HC) 150 mg/$M^3$

Particulate 130 mg/$M^3$

These levels are for 5% dry oxygen in exhaust

Changes in any one of a variety of engine design variables or engine operating variables such as engine compression; combustion chamber shape; rate and location of combustion chamber cooling and/or fuel injection spray pattern, pressure, timing and/or flow rate can have an effect on the emissions in one or more of the above categories. However, such changes can often cause emission in another category to exceed the acceptable limit. For example, as the brake mean effective pressure (bmep) is desirably increased, a tendency arises for smoke in the engine's exhaust to increase. This problem is accentuated by the need to achieve other critical engine operating characteristics such as fuel economy, high torque output, low operating costs and/or reduced maintenance. As one example, the amount of soot that is entrained in the engine's lubrication oil can have a profound effect on the cost of operation and the length of service before a major overhaul is required. Soot is very abrasive and can cause high wear if allowed to become entrained in the engine's lubrication oil to any substantial degree. The amount of soot entrained in the engine's exhaust can be effected by a number of factors such as combustion chamber shape and fuel injection spray angle but changes in these variables can have the undesired effect of actually increasing the other emissions such as smoke and CO emissions entrained in the engines's exhaust.

Many attempts have been made to produce an ideal flow pattern for the charge air and fuel within the combustion chamber of an internal combustion chamber. For example, provision of a combustion bowl in the upper region of a piston to cause, among other things, fuel/charge air mixture within a direct injection engine is well known as disclosed the article entitled "Future Developments . . . ", Automotive Industries, Oct. 15, 1952. While most of the combustion bowl designs disclosed in this article appear to be symmetric about a central axis, the article does not address the critical relationship of the combustion bowl shape and the fuel injection pattern on the specific problems addressed by the subject invention.

A variety of piston designs have been disclosed including symmetrical bowl shaped recesses formed in the upper surface of the piston crown to achieve desired flow patterns within the combustion chamber formed in part by the piston. For example, U.S Pat. No. 4,377,967 discloses an articulated piston assembly including a crown containing a symmetrical combustion bowl in the top surface defined by a cone shaped central floor section which connects at its base to an arcuate surface of revolution coaxial with the central axis of the cone surface wherein the surface of revolution flares upwardly to join with the uppermost surface of the piston. The base of the cone shaped central floor section extends over no more than approximately, 50% of the diameter of the bowl.

The following patents disclose piston designs including cavities in the upper section of the pistons which appear to be symmetrical about a central axis and have a central raised floor section extending radially for a substantial portion of the diameter of the combustion bowl wherein the raised floor section has a relatively large radius of curvature in diametric cross-section and wherein the outer portion of the bowl is characterized by a surface of revolution coaxial with the raised floor section and shaped to form an upwardly curved outer sidewall of the cavity: U.K Patnt Application No. 2,075,147 published Nov. 11, 1996 (FIGS. 1 and 2); U.S. Patent No. 5,029,563 issued Jul. 9, 1996 (FIG. 4) and U.S. Pat. No. 3,508,531 issued Apr. 28, 1970 (FIG. 2). In diametric cross section the curved sidewall, in each instance, would appear to have a radius of curvature that is substantially less than the radius of curvature of the central raised floor section. None of these references discloses any critical size ratios for the disclosed combustion bowl designs and none discloses the importance of the angle of the spray orifices in relationship to the combustion bowl shape.

The assignee of the subject invention, Cummins Engine Company, Inc., is also the assignee of previously issued patents disclosing diesel engine piston designs which incorporate combustion bowl designs. For example, U.S. Pat. No. 1,865,841 issued Jul. 5, 1932 and U.S. Pat. No. 4,242,948 issued Jan. 6, 1981 disclose pistons having a combustion bowl with a "Mexican-hat" design but both of these patents fails to disclose that the combustion bowl has crucial dimensional relationships that are required to achieve specific engine functionalities.

The Cummins Engine Company, Inc. has used commercially articulated pistons having a symmetrical bowl formed in the upper surface of the piston crown but wherein the base of the cone shaped center section extends over a substantial portion of the diameter of the bowl and the apex of the cone is truncated to form a frusto-conical surface.

Many other piston designs containing symmetric combustion bowl designs have been disclosed in previously issued patents. Note, for example, the following patents:

| U.S. Pat. Nos. | |
|---|---|
| 3,805,677 | 4,662,319 |
| 4,056,044 | 4,781,159 |
| 4,161,165 | 4,909,132 |
| 4,180,027 | 4,989,559 |
| 4,286,505 | 5,040,454 |

-continued

Foreign Patents

| | | |
|---|---|---|
| European Patent No. | 0,071,994 | Feb. 16, 1983 |
| German Patent No. | 1,301,657 | Aug. 21, 1969 |
| Japanese App. No. | 59-155551 | Sept. 4, 1984 |
| German (East) Patent No. | 1588 06 | Feb. 2, 1983 |
| Russian App. No. | SU 1107870 A | Aug. 15, 1984 |
| Japanese App. No. | 60-135651 | July 19, 1985 |
| U.K. App. No. | 2,079,851 | Jan. 27, 1982 |

Other prior art piston designs have been disclosed with combustion bowls having specialized shapes designed for producing a desired effect within the combustion chamber. For example the following patents disclose pistons with asymmetrical shapes:

U.S. Pat. Nos.

| | |
|---|---|
| 2,709,992 | 5,305,720 |
| 3,020,900 | 5,320,075 |
| 4,759,323 | 5,322,042 |
| 5,020,485 | |

Foreign Patents

| | | |
|---|---|---|
| U.K. Pat. Spec. No. | 465,656 | May 10, 1937 |
| U.K. Pat. Spec. No. | 713,637 | Aug. 18, 1950 |
| German Patent Doc. No. | M17120 Ia//46a | Aug. 30, 1996 |
| French Patent No. | 1,217,467 | Dec. 7, 1959 |

Despite the many examples of piston designs including combustion bowls in the upper portion of the piston contained in the prior art, none has disclosed a design that is said to function cooperatively with an injector spray plume in a manner to minimize soot entrainment in the engine lubrication oil and simultaneously maintains acceptably low exhaust emissions. A need, thus, exists for a piston and complementary injector design that is capable of achieving this combination of functionality.

SUMMARY OF THE INVENTION

A primary objective of this invention is to overcome the deficiencies of the prior art by providing an internal combustion piston containing a combustion bowl designed to reduce the amount of soot entrained in the lubrication oil of the engine while avoiding substantial increases in other types of undesirable engine emissions.

Another object of the invention is to provide an internal combustion piston containing a combustion bowl whose shape is characterized by a floor section having a large radius in cross section that is designed to cause the fuel mixture plume to develop a desirable shape and is further characterized by an outer section having a small radius in cross section and final tight radius at the piston/cylinder head interface wherein the radii are selected to provide the means to channel the plume, thus forming a desired toroidal flow pattern and achieving an efficient air/fuel mixing.

Another object of the subject invention is to provide a piston as described above wherein the combustion bowl is shaped to cause the spray plume to develop in the initial phase without impingement with the combustion chamber walls, particularly the combustion cylinder, and provides a motion to direct the plume toward the cylinder head, thus achieving better mixing.

Still another object of the invention is to provide an internal combustion engine that achieves the above objects in an engine that has high bmep (e.g. 360 psi) and operates below 4 gms $BSNO_x$ while also satisfying mechanical design constraints for a commercially acceptable engine.

Yet another object of this invention is to provide a piston and injector design that functions to minimizes both the amount of soot entrained in the engine lubrication oil and the amount of undesirable emissions entrained in the engine's exhaust. More particularly, the subject piston bowl and injector of the subject invention is arranged to minimize the amount of contact between the combustion products produced within the combustion chamber with the lubrication oil coating the inside of the cylinder walls swept by the piston and yet promotes excellent mixture of the charge air and fuel to promote thorough combustion of the fuel and relatively low undesirable emission byproducts, such as CO and smoke.

Another object of the subject patent includes provision of a piston containing a combustion bowl formed as an upwardly opening cavity having a maximum depth L and shaped as a surface of revolution having a bowl diameter BD and having a central axis coaxial with the central axis of the spray plume, wherein the surface of revolution including a centrally located raised floor section having a concave curvilinear shape in diametric cross section with a relatively large radius of curvature $R_1$ from a point adjacent the central axis of the combustion bowl to a point adjacent the outer circumference of the combustion bowl and an upwardly flared outer bowl section having a concave curvilinear shape in cross section with a radius of curvature $R_2$ substantially smaller than $R_1$.

Still another object of the subject invention is to provide a piston containing a combustion bowl and injector having a complementary spray plume wherein the combustion bowl is formed as an upwardly opening cavity having a maximum depth L and shaped as a surface of revolution having a bowl diameter BD and having a central axis coaxial with the central axis of the spray plume, wherein the surface of revolution including a centrally located raised floor section having a concave curvilinear shape in diametric cross section with a relatively large radius of curvature $R_1$ from a point adjacent the central axis of the combustion bowl to a point adjacent the outer circumference of the combustion bowl and an upwardly flared outer bowl section having a concave curvilinear shape in cross section with a radius of curvature $R_2$ substantially smaller than $R_1$ and wherein the combustion bowl is characterized by one or more of the following dimensional relationships:

A. the ratio of BD/CD is greater than or equal to 0.54 and is less than or equal to 0.75, B. the ratio of BD/L is greater than 6.2 and is less than or equal to 7.0, C. wherein the ratio of BD/R, is greater than or equal to 1.3 and is less than or equal to 3.4, or D. the ratio of $R_2/R_1$ is greater than 0.14 and is less than or equal to 0.32.

A more specific object of the subject invention is to provide a piston containing a combustion bowl and injector having a complementary spray plume as described above for use in an internal combustion engine having a fuel system for periodically injecting fuel into a combustion chamber of the engine in a spray plume having a central axis that is coaxial with the central axis of the combustion bowl.

A still more specific object of the subject invention is to provide a piston and injector as described above for use in an internal combustion engine including a fuel system includes an injection nozzle containing a plurality of orifices arranged to form the desired spray plume wherein each orifice has a central axis oriented at a spray angle SA equal to or greater than 7 degrees from a plane perpendicular to the central axis of the combustion bowl.

Another object of the subject invention is to provide a piston and injector as described above for use in an internal combustion engine including a fuel system wherein SA is equal to or less than 40 degrees from a plane perpendicular to the central axis of the combustion bowl.

Another object of the subject invention is to provide a piston and injector as described above for use in an internal combustion engine including a fuel system includes an injection nozzle containing a plurality of orifices arranged to form the desired spray plume wherein the injection nozzle includes n orifices and wherein n is equal to or greater than 6, the hydraulic flow for each orifice at 200 psi (1.379 $MP_a$) is between 330 and 438 PPH and the diameter of each orifice is 0.127 to 0.332 mm and wherein the injection pressure would be in the range of 12,000 to 30,000 psi and preferably approximately 22,000 psi.

Another object of this invention is to provide an internal combustion piston having a shape characterized by a floor section having a large radius in cross section that is designed to cause the fuel mixture plume to develop within a combustion chamber and is further characterized by an outer section having a small radius in cross section and final tight radius at the piston/cylinder head interface wherein the radii are selected to provide the means to channel the plume, wherein said raised floor section has a floor diameter FD which is approximately 80 percent of BD.

Yet another object of this invention is to provide an internal combustion piston of the type described above, wherein said upper face of said piston crown contains valve pockets positioned generally equal angularly around the perimeter of said combustion bowl.

Still another object of this invention is to provide an internal combustion piston of the type described above, wherein the raised floor section includes a uppermost flat central section oriented orthogonally with respect to the central axis of said combustion bowl.

According to the invention the above objectives and other more detailed objectives may be achieved by providing a piston for reciprocal movement within a combustion chamber of an internal combustion engine having a fuel injection system arranged to periodically inject fuel into the combustion chamber through one or more injection orifices arranged to form a predetermined spray plume having a central axis, including a piston crown having a piston diameter CD and an upper face arranged to form one wall of the combustion chamber, wherein the piston crown containing a combustion bowl formed by an upwardly opening cavity having a maximum depth L and shaped as a surface of revolution having a bowl diameter BD and having a central axis coaxial with the central axis of the spray plume, and wherein the surface of revolution including a centrally located raised floor section having a diameter equal to approximately 80% of BD and a concave curvilinear shape in diametric cross section with a relatively large radius of curvature $R_1$ from a point adjacent the central axis of the combustion bowl to a point adjacent the outer circumference of the combustion bowl and an upwardly flared outer bowl section having a concave curvilinear shape in cross section with a radius of curvature $R_2$ substantially smaller than $R_1$ and wherein the combustion bowl is characterized by the following dimensional relationships:

A. the ratio of BD/CD is greater than or equal to 0.54 and is less than or equal to 0.75, and is preferably 0.70;

B. the ratio of BD/L is greater than 6.2 and is less than or equal to 7.0, and is preferably 6.67;

C. wherein the ratio of $BD/R_1$ is greater than or equal to 1.3 and is less than or equal to 3.4, and is preferably 1.42; and D. the ratio of $R_2/R_1$ is greater than 0.14 and is less than or equal to 0.32, and is preferably 0.152.

The fuel injector is further characterized by the formation of a spray plume that is generally symmetrical about a central axis that is coaxial with the central axis of the combustion bowl and containing 6 to 10 orifices through which the fuel is injected into the combustion chamber to form the spray plume wherein each orifice has a diameter of 0.127 mm to 0.332 mm and a central axis oriented at a angle SA equal to or greater than 7 degrees from a plane perpendicular to the central axis of the combustion bowl.

By employing the combustion chamber and fuel injector formed in accordance with the subject invention it is possible to run internal combustion engines with operating regimes that were not possible heretofore.

The above described objects and advantages of the subject invention may be better understood by reference to the drawings and the following Brief Description of the Drawings, Description of the Preferred Embodiments, and Claims.

DESCRIPTION OF THE PREFERRED EMBODIMENTS

For a better understanding of the subject invention, reference will now be made specifically to FIG. 1. In this Figure, a cutaway cross-sectional view is shown of an internal combustion engine 2 incorporating the subject invention by which greater control of the charge forming and combustion process is obtained to produce both reduced soot entrainment in the lubrication oil of the internal combustion engine and low levels of undesirable emissions in the engine's exhaust such as carbon monoxide and smoke.

The subject invention derives, at least in part, from the discovery that the amount of soot entrained in the lubrication oil will decrease as the angle of injection of fuel into the combustion chamber becomes deeper, that is, angled more along the central axis of the combustion chamber and less in the radial direction. A further appreciation of the subject invention also requires some understanding of the mechanism of soot generation within the engine. Soot, in the form of minute carbon particles, is formed in the combustion chamber as a normal by-product of the combustion of diesel fuel. A major portion of the soot generated will typically be subsequently burned prior to being discharged from the exhaust system of the diesel engine. During this formation and burning process, opportunity exists for the soot within the combustion chamber to become entrained in the lubrication oil coating the walls of the engine cylinder. Keeping the soot away from the exterior walls to reduce the amount of entrainment is an important feature of the subject invention. At the same time, it is an important feature of the subject invention to reduce soot entrainment in a way that promotes the greatest possible burning of the soot formed so that the soot is not discharged as smoke in the engine's exhaust gases and to maintain other emissions, such as CO and HC at acceptably low levels. As will be explained more fully below, these features are achieved by providing a unique combination of an injector for providing a relatively deep angle of fuel injection into a combustion chamber combined with a piston having a complementarily formed combustion bowl.

Figure 1:
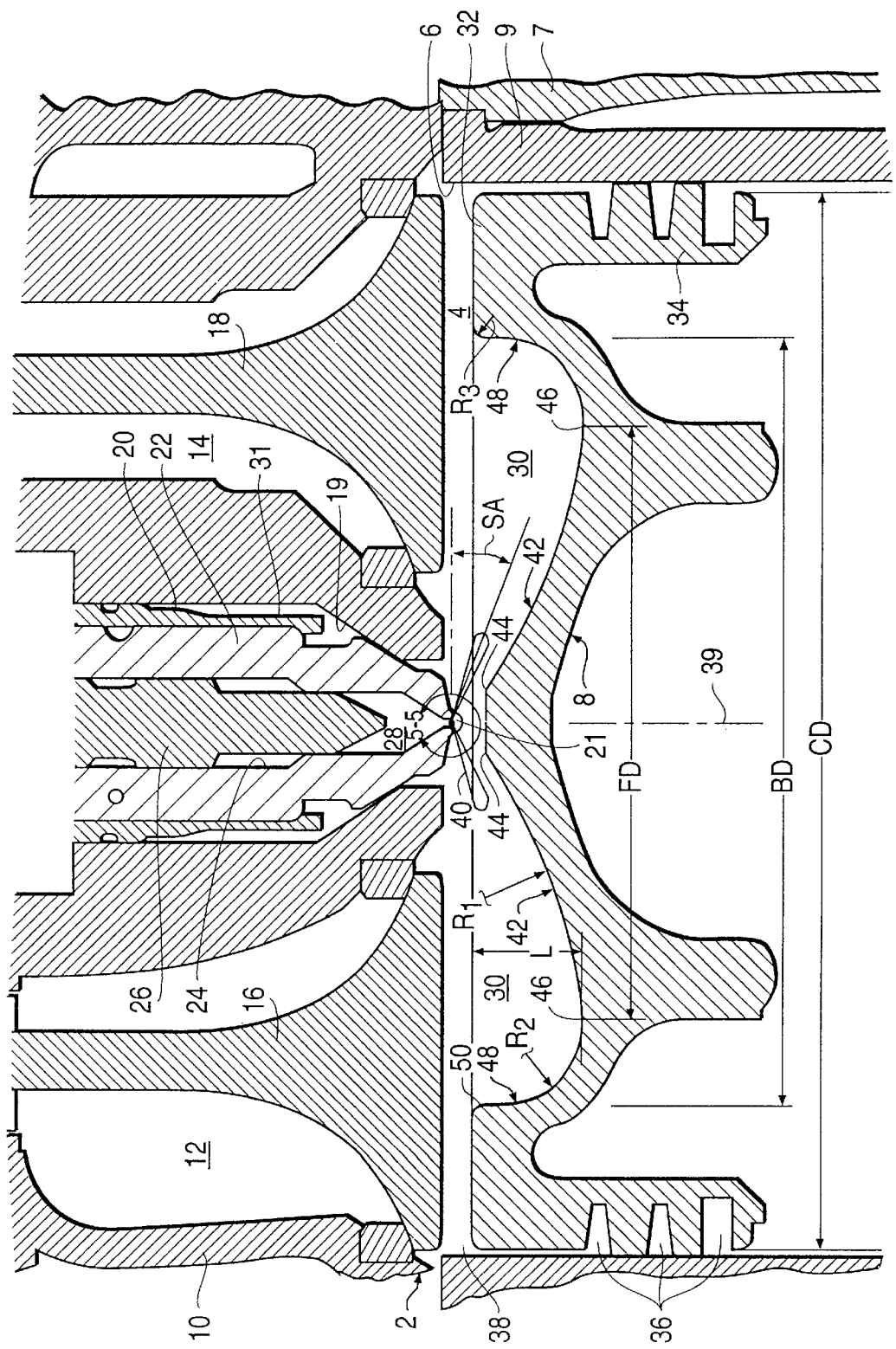
FIG. 1 is a cut away view of an internal combustion engine employing a piston having a combustion bowl and a fuel injector designed in accordance with the subject invention where the piston is illustrated in cross sectional view taken along a plane passing through the central axis of the piston and where the piston is illustrated in a top dead center position corresponding to 0° of the crankshaft crank connected with the piston.

Illustrated partially in FIG. 1 is an internal combustion engine incorporating the subject invention wherein the engine includes an engine block, only a small portion of which is illustrated at 7, and at least one combustion chamber 4. Of course the engine may contain a plurality of combustion chambers, typically four to eight, which may be arranged in line or in a "V" configuration. Each combustion chamber is formed at one end of a cylinder cavity 6 which may be formed directly in the engine block 7. The cylinder cavity 6 may be arranged to receive a removable cylinder liner 9 which is shown only partially in FIG. 1. As is also common, one end of the cylinder cavity is closed by the engine head 10 as will be described more fully below. Mounted within each cylinder liner 9 is a piston 8, only the upper portion of which is shown. The upper surface of piston 8 cooperates with the head 10 and the portion of the cylinder liner 9 extending between the head 10 and piston 8 to define the combustion chamber. Although not specifically illustrated, piston 8 is connected through a connecting rod to the crankshaft of an internal combustion engine which causes the piston to reciprocate along a rectilinear path within cylinder liner 9 as the engine crankshaft rotates.

FIG. 1 shows the position of piston 8 in a top-dead center (TDC) position achieved when the crankshaft is positioned to move the piston to the furthest most position away from the rotational axis of the crankshaft. For purposes of this disclosure, this position of the piston will be referred to as its uppermost position, although, obviously, the cylinder cavity 6 could be oriented in a direction other than vertically and thus as the piston reaches the position shown in FIG. 1, it might not be in its highest vertical position, but would be, nevertheless, at its furthest position from the rotational axis of the engine's crankshaft. This position is sometimes referred to as the zero degree position of the crankshaft when the piston is about to commence the power stroke as described more fully below.

The upper surface of piston 8 is provided with a uniquely formed cavity arranged to direct and manage the flow of charge air, fuel and resultant combustion products within the combustion chamber 4 to achieve the desired engine operation. In particular, the present invention is specifically directed to achieving significantly lower amounts of soot entrainment in the lubrication oil of the internal combustion engine by using a deeper than conventional angle of injection of fuel into the combustion chamber while simultaneously confining and configuring the resulting plume to achieve desired combustion characteristics and to maintain acceptably low emissions satisfactory to meet newly adopted engine operating standards applicable to engines operating in the European market. These new standards, are known as TALuft emissions standards. The deeper injection angle, while effective to limit oil soot, could otherwise increase smoke and carbon monoxide emissions but for the uniquely designed combustion bowl of the subject invention. The precise configuration details that lead to this improved result will be discussed in greater detail hereinbelow.

The internal combustion engine 2 of the subject invention as illustrated in FIG. 1 is a 4-cycle compression ignition (diesel) engine employing direct injection of fuel into each combustion chamber of the engine. As noted above, the outer or upper end of the cylinder cavity 6 is closed off by the engine head 10 arranged to completely close off the engine cylinder cavity except for an intake passage 12, an exhaust passage 14 and an opening for fuel injection. As is typical, intake passage 12 selectively communicates with combustion chamber 4 by means of a pair of poppet valves 16, only one of which is illustrated in FIG. 1. Similarly, the exhaust passage 14 selectively communicates with combustion chamber 4 by means of a pair of poppet valves 18, only one of which is illustrated in FIG. 1. The opening and closing of valves 16 and 18 are caused by a mechanical cam or hydraulic actuation system or other motive system in carefully controlled time sequence with the reciprocal movement of piston 8. In the present invention, the sequence of opening and closing of valves 16 and 18 has a repeating pattern which reoccurs with each two successive rotations (720 degrees) of the crankshaft to define the four strokes of the 4-cycle engine, namely intake, compression, power and exhaust.

At the uppermost, TDC position shown in FIG. 1, piston 8 has just completed its upward compression stroke during which the charge air allowed to enter the combustion chamber 4 from intake passage 12 is compressed thereby raising its temperature above the ignition temperature of the engine's fuel. This position is usually considered the zero position commencing the 720 degrees of rotation required to complete 4 strokes of piston 8. The amount of charge air that is caused to enter the combustion chamber is typically increased by providing a pressure boost in the engine's intake manifold. This pressure boost may be provided, for example, by a turbo charger, not illustrated, driven by a turbine powered by the engine's exhaust, or by a compressor, not illustrated, driven by the engine's crankshaft.

From the position illustrated in FIG. 1, piston 8 moves downwardly to commence its power stroke. At, or just before this downward movement of piston 8, a fuel injector 20, mounted in an injector cavity 19 contained within the head 10, is caused to inject fuel at very high pressure into combustion chamber 4. Injector 20 includes, at its lower end, an injector nozzle 22 which is held to the remainder of the injector assembly, not illustrated, by means of a nozzle retainer 31. As will be described in greater detail hereinbelow, the fuel is caused to enter combustion chamber 4 through a plurality of tiny injection orifices, formed in the lower end of injector nozzle 22, at very high pressure (12,000 to 30,000 psi, preferably approximately 22,000 psi) to induce thorough intermixture of the fuel with the high temperature, compressed charge air within combustion chamber 4. Injector 20 may be of the cam operated unit injector type such as illustrated in commonly assigned U.S. Pat. Nos. 5,299,738 and 5,445,323. The assignee of this application, Cummins Engine Company, Inc. manufactures a suitable type of injector under the designation number 3329311. An injector of this type typically includes an injector nozzle 22 containing a central bore 24. Within bore 24 reciprocates in timed, synchronized movement with the reciprocal movement of piston 8, a lower plunger 26 arranged when positioned as shown in FIG. 1 to form an injection cavity 28 within injector nozzle 22. As is described in greater detail in U.S. Pat. No. 5,299,738, fuel is metered into injection chamber 28 while plunger 26 rests in the withdrawn position illustrated in FIG. 1. Upon downward movement of piston 8, lower plunger 26 is similarly advanced to cause the fuel metered into injection chamber 28 to be forced through injection orifices 21 at very high pressure, e.g., 12,000 to 30,000 psi and preferably at approximately 22,000 psi.

As an alternative to the unit injector 20 illustrated in FIG. 1, the fuel could be injected into the combustion chamber using a fuel system that provides only a nozzle in communication with each combustion chamber connected to a centrally located fuel pump through a separate fuel line dedicated to a particular combustion chamber to allow the timing of fuel injection to occur at the centrally located fuel pump. An example of this type of fuel system is disclosed in commonly assigned published PCT Application No. WO 94/27041 dated Nov. 24, 1994.

To achieve the low soot entrainment in the engine's lubrication oil and to maintain low emissions, particularly of CO and smoke in the exhaust gases, the upper surface of piston 8 is provided with a symmetrical cavity which forms a combustion bowl for forming, directing, and constraining the pattern of gaseous flow within the combustion chamber 4 during the initial stages of fuel injection. The combustion bowl shape is also designed to provide appropriate constraint of the gas flow within the combustion chamber during initiation of combustion and expansion of the resulting gases during the power stroke and subsequently during the exhaust stroke of piston 8. The manner by which combustion bowl 30 achieves this result will be described in still greater detail in FIGS. 2 through 4.

To understand the unique physical characteristics of the combustion bowl, however, attention is initially directed to FIG. 1 in which the combustion bowl 30 is shown to have a generally toroidal shape which is sometimes referred to as a "Mexican Hat" form. While this general shape has antecedents in the prior art, it is the specific configuration, and more importantly, the critical dimensional ratios described herein below which results in the improved functional performance of the subject invention. More particularly, the upper portion of piston 8 may be referred to as the piston crown 32. This area of the piston includes a depending cylindrical wall having a plurality of outwardly opening, annular grooves 36 for receiving corresponding piston rings designed to form a relatively tight combustion gas seal between the piston and the surrounding walls of the cylinder liner 6. This cylinder wall area will typically be coated with a very thin layer of engine lubrication oil film 38 (illustrated by dots in FIG. 1). The existence of this thin layer of lubrication oil is crucial in maintaining an appropriate gas seal and in minimizing frictional losses and excessive heat generation due to the sweeping motion of the piston as it reciprocates within the engine cylinder. Lubrication oil film 38 is continuously replenished with new lubrication oil applied to a portion of the inner wall of liner 9 below the piston rings, not illustrated, that would be located in grooves 36. The mechanism for applying the lubrication oil is not illustrated in FIG. 1.

To the extent that film 38 comes into contact with the combustion gases within the combustion chamber 4, the possibility arises for soot formed as a natural process of combustion to become entrained within the lubrication film and eventually to work its way below the piston rings where it may become intermixed with the engine lubrication oil. An important objective of the subject invention is to minimize the amount of soot which actually reaches and becomes entrained in film 38 by promoting as thorough and efficient combustion of the fuel within combustion bowl 30 as possible while creating and constraining the flow of gases within the combustion chamber 4 to further minimize the possibility of soot entrainment within film 38.

Turning now specifically to FIG. 1, the combustion bowl 30 is characterized by an upwardly opening cavity having a maximum depth L and is shaped as a surface of revolution having a maximum diameter BD. The central axis 39 of the combustion chamber is coincident with the central axis of the fuel injector 20 and more importantly, coincident with the central axis of the pattern of fuel injected into the combustion chamber by the fuel injector. This fuel spray pattern or plume 40 is arranged to enter the combustion chamber through a plurality of injection orifices 21, as noted above, with the central axis of each orifice being arranged at a relatively steep angle SA which may range between 7° and 40° from a plane perpendicular to the central axis 39. A more specific and desirable range would be between 15° and 20°.

To help in properly shaping the pattern of fuel and charge air mixture within the combustion chamber, the surface of revolution forming the combustion bowl includes a centrally located raised floor section 42 having a concave, curvilinear shape in diametric cross section. This curvilinear shape has a relatively large radius of curvature $R_1$ from a point 44 adjacent to central axis 39 of the combustion bowl to a point 46 adjacent to the outer circumference of the combustion bowl. The surface of revolution forming combustion bowl 30 further includes an upwardly flared outer bowl section 48 having a concave curvilinear shape in cross section with a radius of curvature $R_2$ substantially smaller than $R_1$. The apex of the raised floor section is truncated to form a planar central section 49 in direct alignment with the injector nozzle 22 and oriented perpendicular to axis 39.

To achieve the objectives of the subject invention, the inventors have determined that the combustion bowl 30 and the piston within which it is contained should conform to certain key dimensional criticalities. In particular, the dimensions referred to above should conform to at least one, and preferably all, of the following dimensional relationships:

A. the ratio of BD/CD should be greater than or equal to 0.54 and should be less than or equal to 0.75, and is preferably 0.70;

B. the ratio of BD/L should be greater than 6.2 and should be less than or equal to 7.0, and is preferably 6.67;

C. the ratio of $BD/R_1$ should be greater than or equal to 1.3 and should be less than or equal to 3.4, and is preferably 1.42; and D. the ratio of $R_2/R_1$ should be greater than 0.14 and should be less than or equal to 0.32, and is preferably 0.152.

Outer bowl section 48 extends upwardly and intersects with the uppermost surface of piston 8 in a circumferential zone 50 having a relatively tight radius of curvature $R_3$ in the diametric cross sectional plane illustrated in FIG. 1. The relatively gentle radius of curvature $R_1$ in the central raised floor section of the combustion bowl has the effect of gently bending the plume 40 upwardly, yet allows for appropriate mixture of the fuel and charge air. This central raised floor section 42 has a diameter FD which may equal approximately 80% of the total diameter BD of the combustion bowl 30. Thus, the fuel and charge air are permitted to intermix fairly thoroughly before engaging the upwardly flared outer bowl section 48 where the relatively smaller radius of curvature $R_2$ has the effect of redirecting the flow into a toroidal pattern that has been found to achieve the object of the subject invention far better than previously known combustion bowl designs having the known "Mexican-Hat" configuration. These improved results derive from maintaining the dimensional characteristics of the combustion bowl within the limits expressed above.

As noted above, piston 8 is illustrated in FIG. 1 in a position it would occupy when the crankshaft is in the zero degree position just as piston 8 is commencing its downward power stroke. In a 4-cycle compression ignition (diesel) engine of the type illustrated in FIG. 1, piston 8 will have just completed its compression stroke, thereby raising the temperature of the charge air to a level at which fuel entering the combustion chamber from injector 20 will self-ignite, thereby providing further increase in pressure to cause piston 8 to impart force to the crankshaft during the power stroke.

Figure 2:
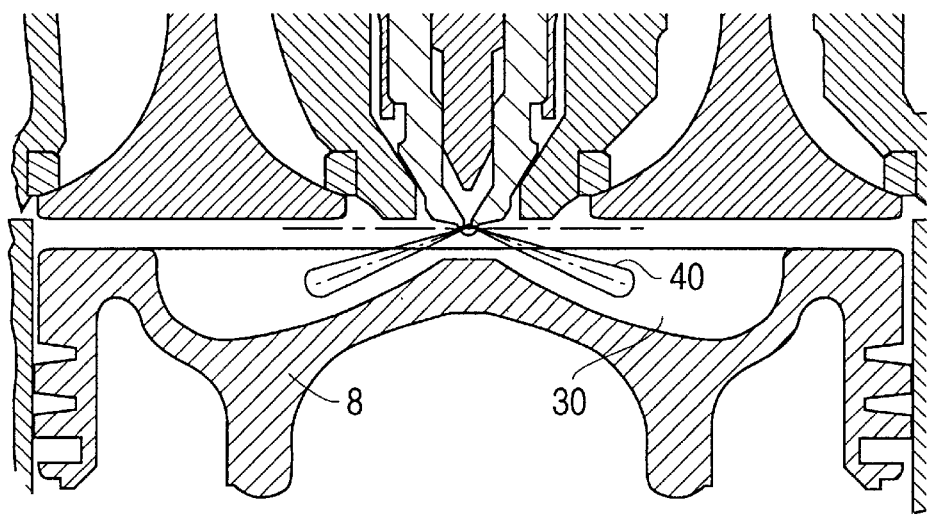
FIG. 2 is cut away cross sectional view of the internal combustion engine of FIG. 1 wherein the piston has moved downwardly within the engine cylinder by an amount corresponding to a positive 5° of motion from top dead center of the corresponding crank.
Figure 3:
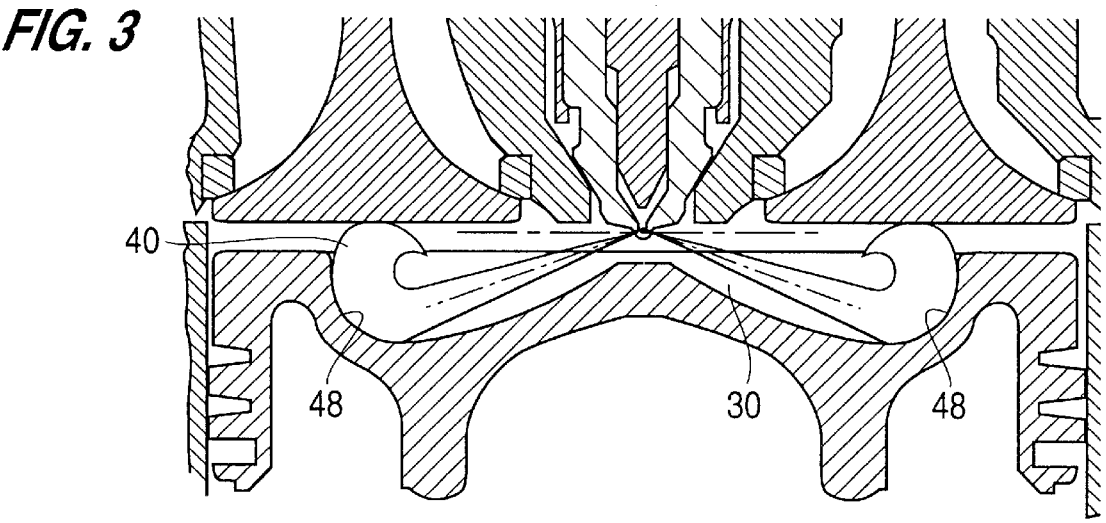
FIG. 3 is cut away cross sectional view of the internal combustion engine of FIG. 1 wherein the piston has moved downwardly within the engine cylinder by an amount corresponding to a positive 15° of motion from top dead center of the corresponding crank.
Figure 4:
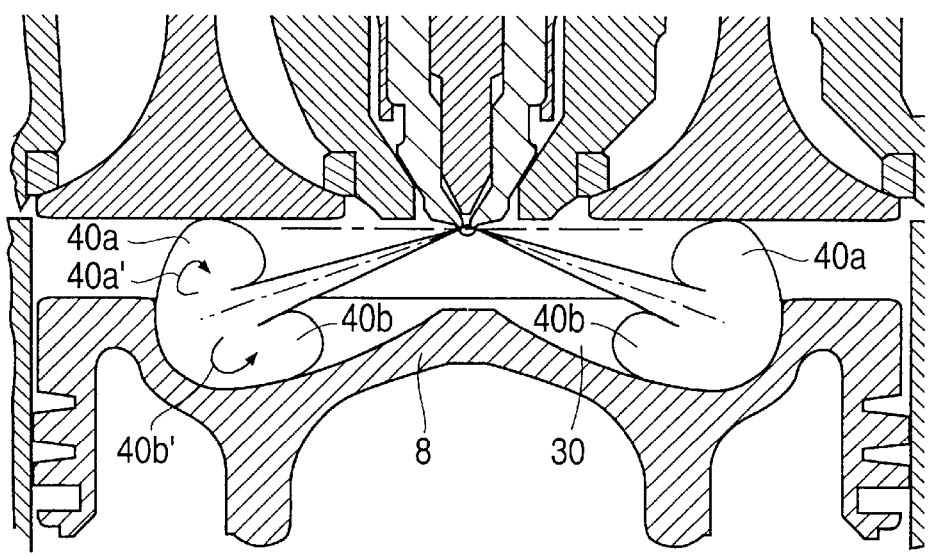
FIG. 4 is cut away cross sectional view of the internal combustion engine of FIG. 1 wherein the piston has moved downwardly within the engine cylinder by an amount corresponding to a positive 30° of motion from top dead center of the corresponding crank.

Turning now to FIGS. 2 through 4, piston 8 is illustrated in various stages of descent during its power stroke. In particular, FIG. 2 illustrates the position of piston 8 as the crankshaft has moved to 5° from its top dead center shown in FIG. 1. At this stage, the plume 40 will have spread radially outwardly and downwardly to enter a substantial portion of the combustion bowl.

In FIG. 3 piston 8 has progressed further in the power stroke to approximately the position occupied when the crankshaft has advanced 15° of rotation from top dead center shown in FIG. 1. In this view, plume 40 has advanced still further into the combustion bowl and has engaged the upwardly flared outer bowl section 48 to cause the commencement of a first toroidal flow of combustion gases and charge air within combustion chamber 4.

FIG. 4 shows piston 8 at a further advanced stage during its power stroke wherein the crankshaft has assumed a 30° advanced rotation from the position illustrated in FIG. 1. At this stage, plume 40 has advanced still further to form both an expanded first toroidal portion 40a corresponding to that illustrated in FIG. 3 and a second toroidal flow pattern 40b formed generally below 40a. As generally illustrated by arrows 40a' and 40b' corresponding toroidal sections include gaseous flow rotating in generally opposite directions. The counter rotating toroidal flow paths of 40a and 40b result from the complementary interplay of the deep angle fuel injection plume 40 in the complementarily shaped combustion bowl 30 described above.

Figure 5:
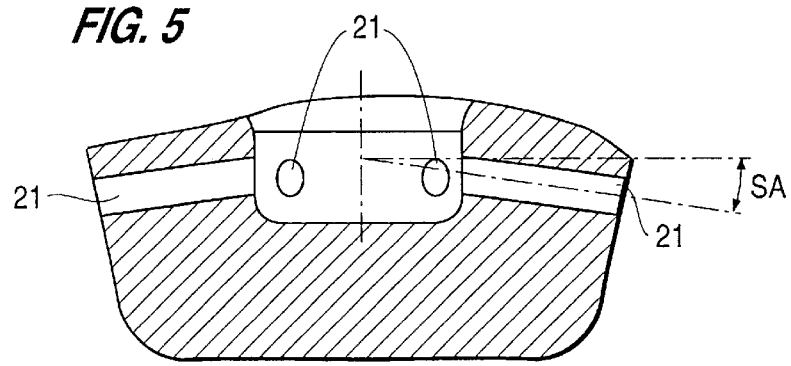
FIG. 5 is a enlarged cut-away, cross sectional view taken within lines 5—5 of FIG. 1 illustrating that portion of the nozzle of the fuel injector which contains the injection orifices.

Attention is further directed to FIG. 5 which is a cutaway and enlarged cross sectional view of the nozzle tip taken along lines 5—5 of FIG. 1. In this view, four injection orifices 21 are visible out of a total of six orifices that are equal angularly positioned about the central axis of the fuel injector 20. This arrangement of six injection orifices, in total, is responsible for forming the plume 40 illustrated in FIGS. 1 through 4. An important aspect of the subject invention involves orienting the central axis of each orifice 21 in relatively steep angle SA equal to or greater than 7° and less than or equal to 40°. Preferably this angle would be between 15° and 20°. Such a relatively deep angle of injection creates a plume which is further shaped, constrained and directed by the uniquely formed combustion bowl of the subject invention to produce low soot entrainment within the lubrication oil of the engine and at the same time maintain low levels of emission, especially carbon monoxide and smoke.

Figure 6:
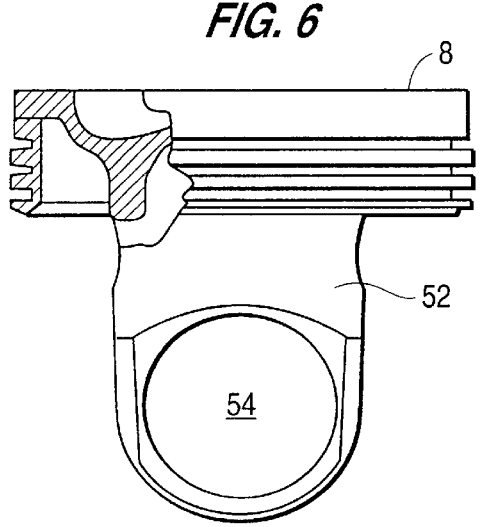
FIG. 6 is a side elevation view, including a partial cut away cross sectional view, of the crown of the piston illustrated in FIGS. 1–4 taken along the central axis of the piston pin bores.
Figure 7:
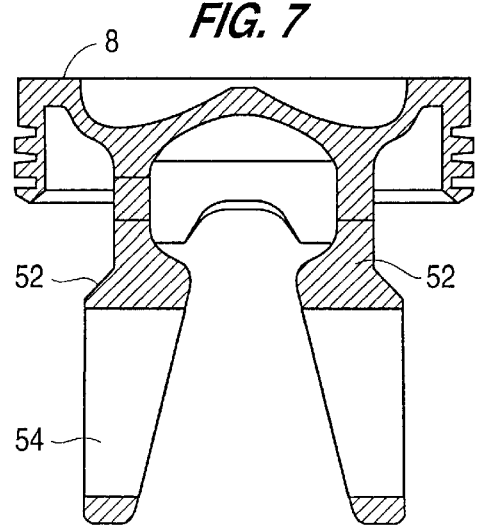
FIG. 7 is a cross section view of the piston crown illustrated in FIG. 6 taken along lines 7—7 of FIG. 6.
Figure 8:
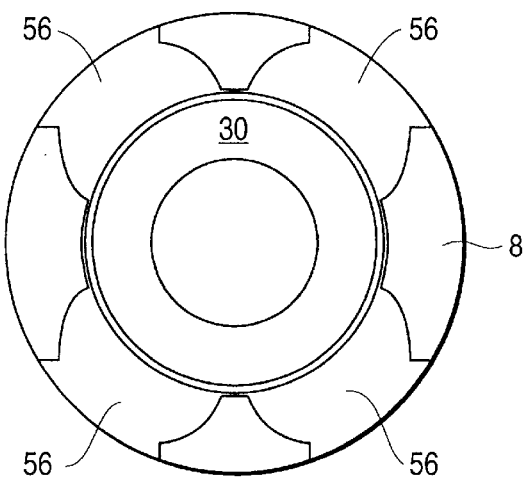
FIG. 8 is a top elevational view of the piston crown of FIGS. 6 and 7 illustrating the piston combustion bowl and valve pockets.

FIGS. 6 through 8 disclose side and top elevational views of the upper portion of piston 8 including a pair of depending wrist pin bosses 52. These bosses 52 include aligned wrist pin receiving bores 54 for connecting the piston crown with a connecting rod that in turn connects the piston to the crankshaft of the engine. Although not shown, the piston may include a skirt portion surrounding bosses 52 for accommodating side-to-side thrusts within the engine cylinder cavity 6. The skirt portion may be mounted for a limited rotational movement on the wrist pin passing through boss 52 to form an articulated piston as illustrated in a plurality of the above-identified prior art references such as for example U.S. Pat. Nos. 4,056,044 and 4,377,967.

FIG. 8 is a top elevational view of piston 8 in which the symmetrical circular configuration of the combustion bowl 30 is clearly visible. In addition, a plurality of four valve pockets 56 are illustrated as being formed in the outer circumferential portion of the upper face of piston 8 to accommodate both the intake and exhaust valves and thereby ensure appropriate clearance and yet allow the piston to reach a top dead center position which insures an adequately high compression ratio (e.g., 1:12 to 1:20).

Figure 9:
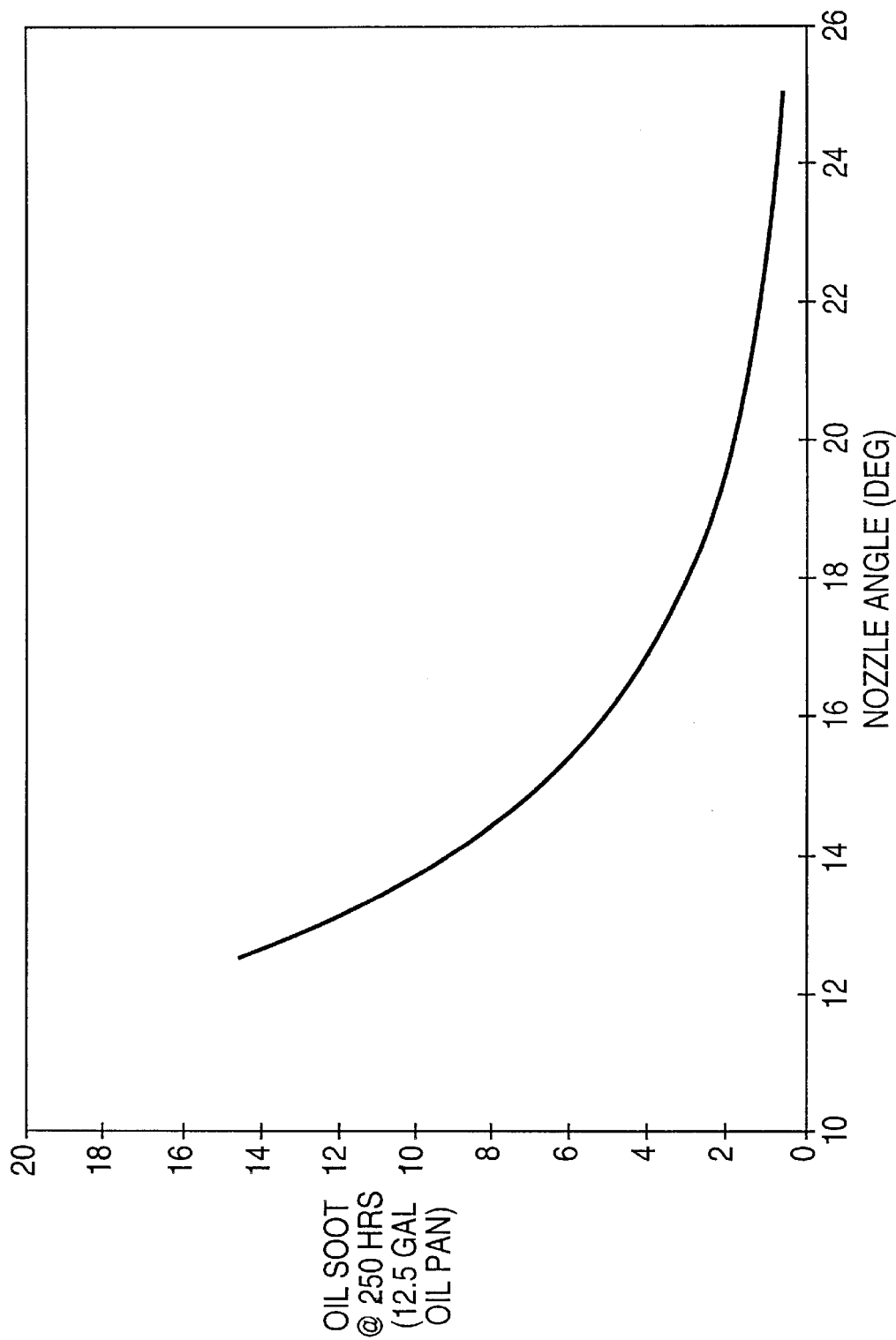
FIG. 9 is a graph illustrating the effect of different angles for the fuel injector nozzle orifices on the amount of soot entrained in the lubrication oil of an internal combustion engine equipped with a piston and injector designed in accordance with the subject invention.
Figure 10:
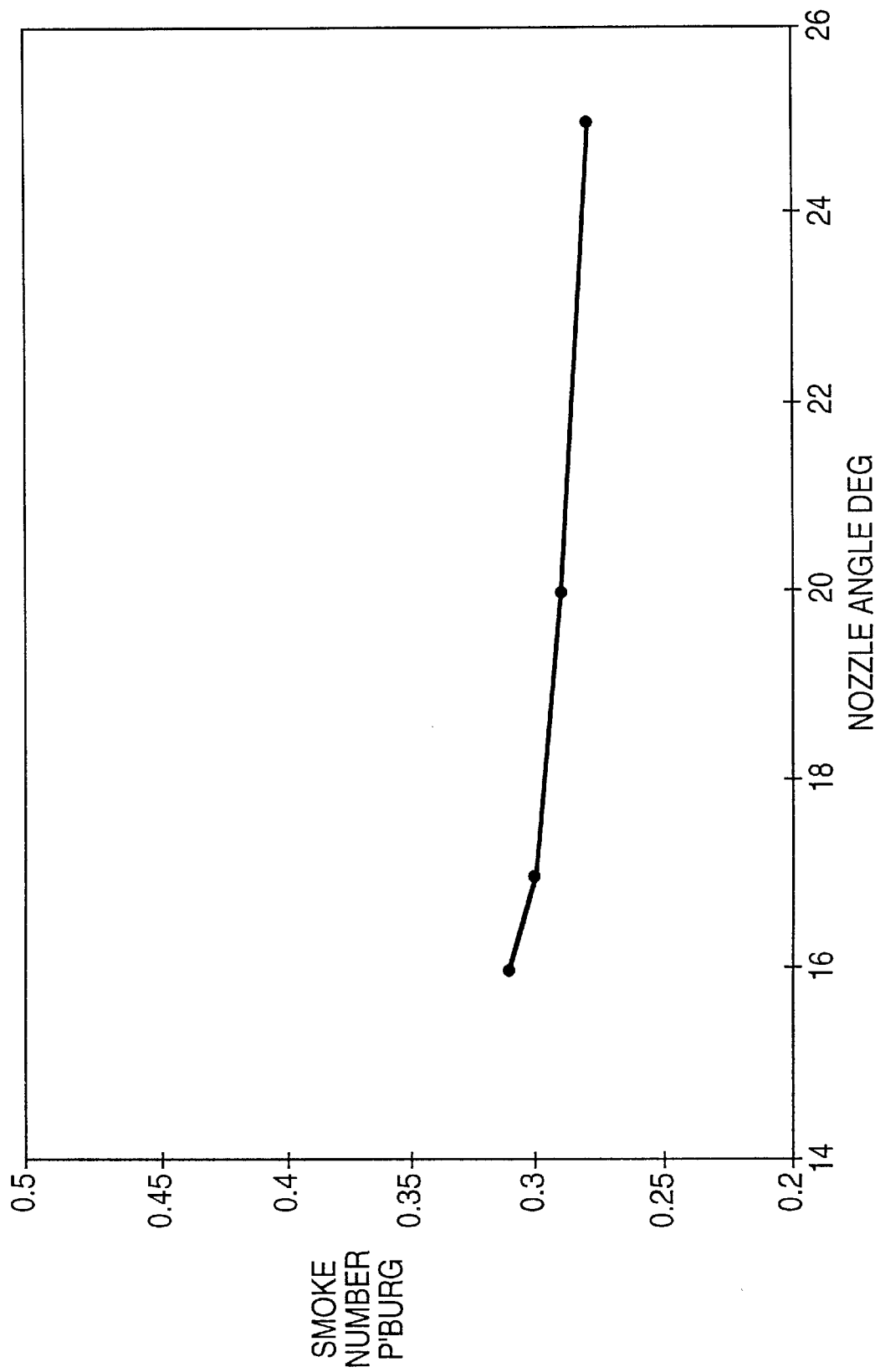
FIG. 10 is a graph illustrating the effect of different angles for the fuel injector nozzle orifices on the exhaust smoke produced by an internal combustion engine equipped with a piston and injector designed in accordance with the subject invention.
Figure 11A:
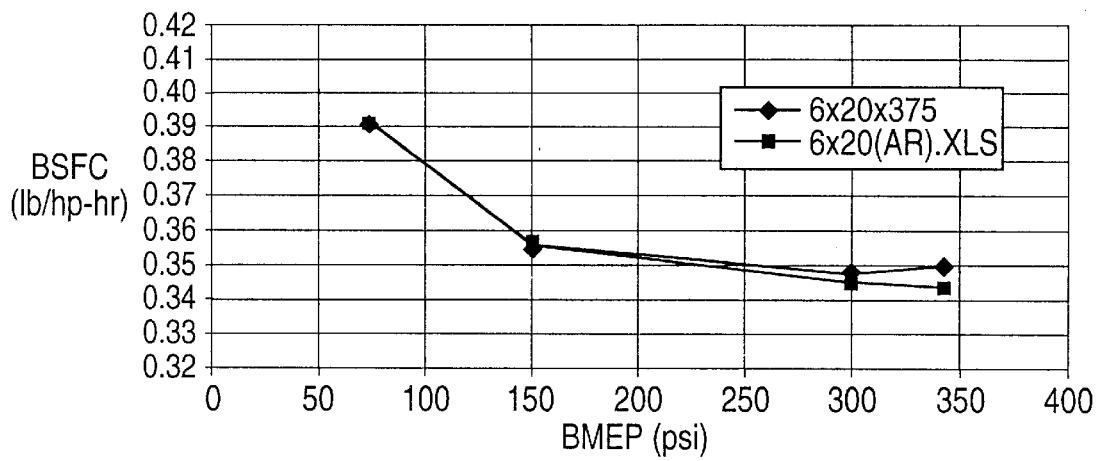
FIGS. 11a–11d are graphs illustrating operating characteristics and emissions of a test engine employing the subject invention.
Figure 11B:
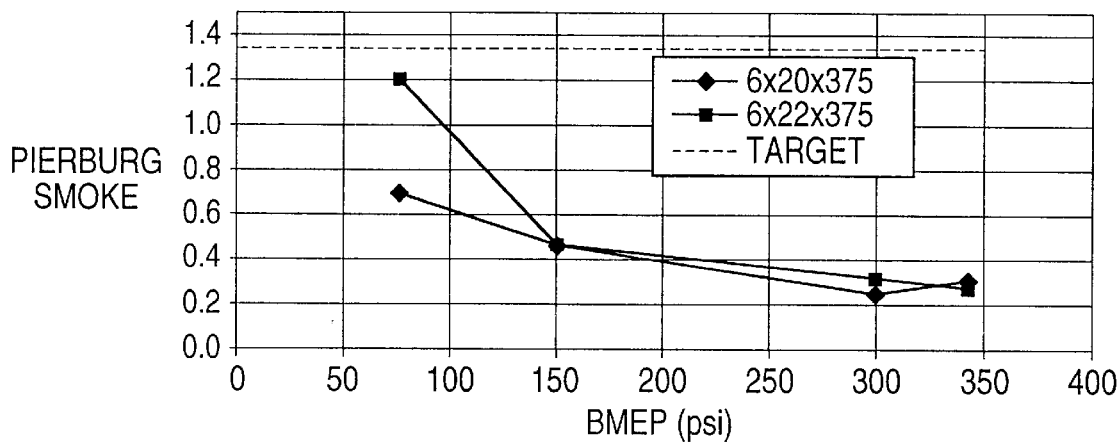
Figure 11C:
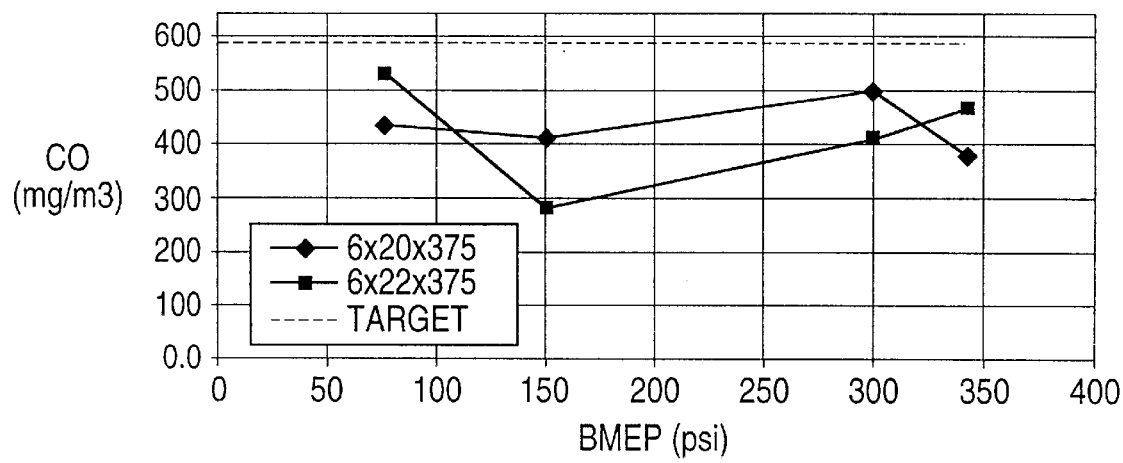
Figure 11D:
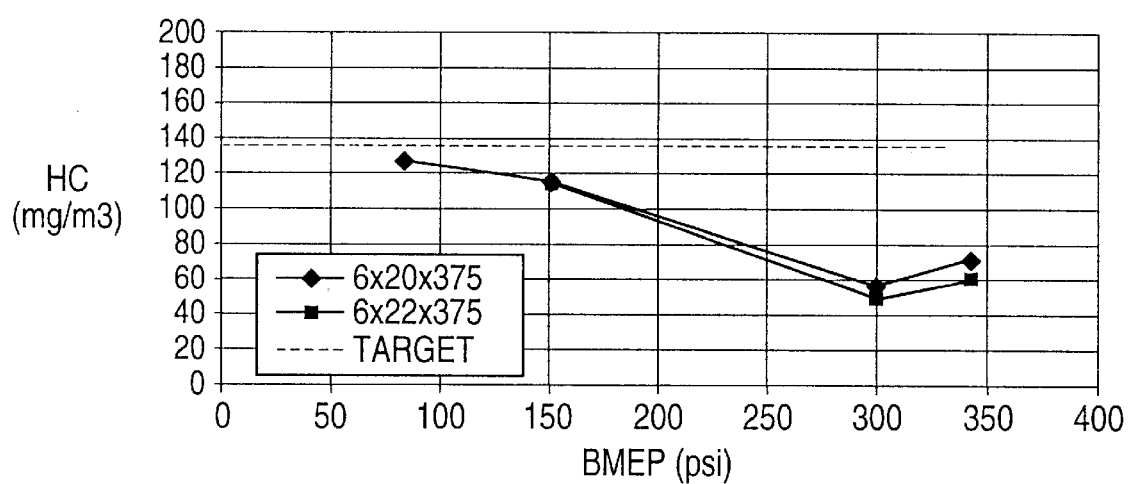

By implementing the subject invention in an internal combustion engine of the compression ignition type equipped with articulated pistons as shown in FIGS. 6 through 8, it is possible to achieve an acceptably low level of soot entrainment within the lubrication oil of the engine while maintaining low emissions, particularly carbon monoxide and smoke. For example, oil soot below 1.5% by volume after 250 hours of operation at rated conditions of an engine employing the subject invention has been demonstrated in tests conducted by the assignee of this invention. FIG. 9 illustrates these results. This graph demonstrates the importance of the orientation angle SA of the injection orifices arranged to form a deep angle plume in combination with a combustion bowl formed in accordance with the dimensional relationships referred to above. In particular, FIG. 9 illustrates the amount of oil soot found in the lubrication oil of an engine having 12.5 gallons of lubrication oil, operating at full load at 1500 rpm for 250 hours. The injection angle SA was varied between approximately 13 degrees and 25 degrees. Attention is also directed to FIG. 10 which relates the smoke number to various angles of injection selected for the injection orifices 21 in the range of 15° to 22° for an internal combustion engine designed in accordance with the subject invention.

FIG. 11 illustrates additional tests conducted on an test engine (designated P3.3) employing the subject invention (with SA equal to 20 degrees) in which oil soot after 250 hours at full load with a 20 gallon lubrication oil pan was measured at only around 1% by volume. The test engine, designated BTALR7, included articulated pistons with top piston ring located 13.5 mm below the piston crown rim, P12 cylinder head and injectors designated as A4057/AM36M2A, F1746 @ 0.395". $NO_x$ measured 1.8 gm. FIG. 11a illustrates the brake specific fuel consumption (BSFC) of the test engine over a BMEP range of approximately 75 to 345 psi. FIG. 11b discloses exhaust smoke measurements over the same BMEP range. FIGS. 11c and 11d disclose CO and HC exhaust content measurements over the same BMEP range.

An internal combustion engine designed in accordance with the subject invention would have a number of important industrial applications. Of particular importance would be the application of an engine so constructed as the power plant in a generator set. Engines of this sort can be formed to operate in full compliance with the TALuft standards that will become effective in the European market.

We claim:

1. A piston for reciprocal movement within a combustion chamber of an internal combustion engine having a fuel injection system arranged to periodically inject fuel into the combustion chamber through one or more injection orifices arranged to form a predetermined spray plume having a central axis, comprising:

a piston crown having a piston diameter CD and an upper face arranged to form one wall of the combustion chamber, said piston crown containing a combustion bowl formed by an upwardly opening cavity shaped as a surface of revolution having a bowl diameter BD and having a central axis coaxial with the central axis of the spray plume and further having a depth L defined by a distance between a top portion of the combustion bowl and a bottom portion of the combustion bowl that is the farthest removed from said top portion measured along said central axis, said surface of revolution including a centrally located raised floor section having a concave curvilinear shape in diametric cross section with a radius of curvature $R_1$ from a point adjacent the central axis of the combustion bowl to a point adjacent the outer circumference of the combustion bowl and an upwardly flared outer bowl section having a concave curvilinear shape in cross section with a radius of curvature $R_2$ smaller than $R_1$ wherein the ratio of BD/CD is greater than or equal to 0.54 and is less than or equal to 0.75.

2. An internal combustion engine containing at least one combustion chamber and the piston of claim 1 mounted for reciprocal movement within said combustion chamber and a fuel system for periodically injecting fuel into said combustion chamber in an spray plume which is symmetrical about a central axis that is coaxial with the central axis of said combustion bowl.

3. An internal combustion engine as defined in claim 2, wherein said fuel system includes an injection nozzle containing a plurality of orifices arranged to form said spray plume, each said orifice having a central axis oriented at a spray angle SA equal to or greater than 7 degrees from a plane perpendicular to the central axis of said combustion bowl.

4. An internal combustion engine as defined in claim 3, wherein SA is equal to or less than 40 degrees from a plane perpendicular to the central axis of said combustion bowl.

5. A piston for reciprocal movement within a combustion chamber of an internal combustion engine having a fuel injection system arranged to periodically inject fuel into the combustion chamber through one or more injection orifices arranged to form a predetermined spray plume having a central axis, comprising: a piston crown having a piston diameter CD and an upper face arranged to form one wall of the combustion chamber, said piston crown containing a combustion bowl formed by an upwardly opening cavity shaped as a surface of revolution having a bowl diameter BD and having a central axis coaxial with the central axis of the spray plume and further having a depth L defined by a distance between a top portion of the combustion bowl and a bottom portion of the combustion bowl that is the farthest removed from said top portion measured along said central axis, said surface of revolution including a centrally located raised floor section having a concave curvilinear shape in diametric cross section with a radius of curvature $R_1$ from a point adjacent the central axis of the combustion bowl to a point adjacent the outer circumference of the combustion bowl and an upwardly flared outer bowl section having a concave curvilinear shape in cross section with a radius of curvature $R_2$ smaller than $R_1$ wherein the ratio of BD/L is greater than 6.2 and is less than or equal to 7.0.

6. An internal combustion engine containing at least one combustion chamber and the piston of claim 5 mounted for reciprocal movement within said combustion chamber and a fuel system for periodically injecting fuel into said combustion chamber in an spray plume which is symmetrical about a central axis that is coaxial with the central axis of said combustion bowl.

7. An internal combustion engine as defined in claim 6, wherein said fuel system includes an injection nozzle containing a plurality of orifices arranged to form said spray plume, each said orifice having a central axis oriented at a spray angle SA equal to or greater than 7 degrees from a plane perpendicular to the central axis of said combustion bowl.

8. An internal combustion engine as defined in claim 7, wherein SA is equal to or less than 40 degrees from a plane perpendicular to the central axis of said combustion bowl.

9. A piston for reciprocal movement within a combustion chamber of an internal combustion engine having a fuel injection system arranged to periodically inject fuel into the combustion chamber through one or more injection orifices arranged to form a predetermined spray plume having a central axis, comprising:

a piston crown having a piston diameter CD and an upper face arranged to form one wall of the combustion chamber, said piston crown containing a combustion bowl formed by an upwardly opening cavity shaped as a surface of revolution having a bowl diameter BD and having a central axis coaxial with the central axis of the spray plume and further having a depth L defined by a distance between a top portion of the combustion bowl and a bottom portion of the combustion bowl that is the farthest removed from said top portion measured along said central axis, said surface of revolution including a centrally located raised floor section having a concave curvilinear shape in diametric cross section with a radius of curvature $R_1$ from a point adjacent the central axis of the combustion bowl to a point adjacent the outer circumference of the combustion bowl and an upwardly flared outer bowl section having a concave curvilinear shape in cross section with a radius of curvature $R_2$ smaller than $R_1$ wherein the ratio of $BD/R_1$ is greater than or equal to 1.3 and is less than or equal to 3.4.

10. An internal combustion engine containing at least one combustion chamber and the piston of claim 9 mounted for reciprocal movement within said combustion chamber and a fuel system for periodically injecting fuel into said combustion chamber in an spray plume which is symmetrical about a central axis that is coaxial with the central axis of said combustion bowl.

11. An internal combustion engine as defined in claim 10, wherein said fuel system includes an injection nozzle containing a plurality of orifices arranged to form said spray plume, each said orifice having a central axis oriented at a spray angle SA equal to or greater than 7 degrees from a plane perpendicular to the central axis of said combustion bowl.

12. An internal combustion engine as defined in claim 11, wherein SA is equal to or less than 40 degrees from a plane perpendicular to the central axis of said combustion bowl.

13. A piston for reciprocal movement within a combustion chamber of an internal combustion engine having a fuel injection system arranged to periodically inject fuel into the combustion chamber through one or more injection orifices arranged to form a predetermined spray plume having a central axis, comprising:

a piston crown having a piston diameter CD and an upper face arranged to form one wall of the combustion chamber, said piston crown containing a combustion bowl formed by an upwardly opening cavity shaped as a surface of revolution having a bowl diameter BD and having a central axis coaxial with the central axis of the spray plume and further having a depth L defined by a distance between a top portion of the combustion bowl and a bottom portion of the combustion bowl that is the farthest removed from said top portion measured along said central axis, said surface of revolution including a centrally located raised floor section having a concave curvilinear shape in diametric cross section with a radius of curvature $R_1$ from a point adjacent the central axis of the combustion bowl to a point adjacent the outer circumference of the combustion bowl and an upwardly flared outer bowl section having a concave curvilinear shape in cross section with a radius of curvature $R_2$ smaller than $R_1$ wherein the ratio of $R_2/R_1$ is greater than 0.14 and is less than or equal to 0.32.

14. An internal combustion engine containing at least one combustion chamber and the piston of claim 13 mounted for reciprocal movement within said combustion chamber and a fuel system for periodically injecting fuel into said combustion chamber in an spray plume which is symmetrical about a central axis that is coaxial with the central axis of said combustion bowl.

15. An internal combustion engine as defined in claim 14, wherein said fuel system includes an injection nozzle containing a plurality of orifices arranged to form said spray plume, each said orifice having a central axis oriented at a spray angle SA equal to or greater than 7 degrees from a plane perpendicular to the central axis of said combustion bowl.

16. An internal combustion engine as defined in claim 15, wherein SA is equal to or less than 40 degrees from a plane perpendicular to the central axis of said combustion bowl.

17. A piston as defined in claim 1, wherein the ratio of BD/L is greater than 6.2 and is less than or equal to 7.0.

18. An internal combustion engine containing at least one combustion chamber and the piston of claim 17 mounted for reciprocal movement within said combustion chamber and a fuel system for periodically injecting fuel into said combustion chamber in an spray plume which is symmetrical about a central axis that is coaxial with the central axis of said combustion bowl.

19. An internal combustion engine as defined in claim 18, wherein said fuel system includes an injection nozzle containing a plurality of orifices arranged to form said spray plume, each said orifice having a central axis oriented at a spray angle SA equal to or greater than 7 degrees from a plane perpendicular to the central axis of said combustion bowl.

20. An internal combustion engine as defined in claim 19, wherein SA is equal to or less than 40 degrees from a plane perpendicular to the central axis of said combustion bowl.

21. A piston as defined in claim 1, wherein the ratio of $BD/R_1$ is greater than or equal to 1.3 and is less than or equal to 3.4.

22. An internal combustion engine containing at least one combustion chamber and the piston of claim 21 mounted for reciprocal movement within said combustion chamber and a fuel system for periodically injecting fuel into said combustion chamber in an spray plume which is symmetrical about a central axis that is coaxial with the central axis of said combustion bowl.

23. An internal combustion engine as defined in claim 22, wherein said fuel system includes an injection nozzle containing a plurality of orifices arranged to form said spray plume, each said orifice having a central axis oriented at a spray angle SA equal to or greater than 7 degrees from a plane perpendicular to the central axis of said combustion bowl.

24. An internal combustion engine as defined in claim 23, wherein SA is equal to or less than 40 degrees from a plane perpendicular to the central axis of said combustion bowl.

25. A piston as defined in claim 1, wherein the ratio of $R_2/R_1$ is greater than 0.14 and is less than or equal to 0.32.

26. An internal combustion engine containing at least one combustion chamber and the piston of claim 25 mounted for reciprocal movement within said combustion chamber and a fuel system for periodically injecting fuel into said combustion chamber in an spray plume which is symmetrical about a central axis that is coaxial with the central axis of said combustion bowl.

27. An internal combustion engine as defined in claim 26, wherein said fuel system includes an injection nozzle containing a plurality of orifices arranged to form said spray plume, each said orifice having a central axis oriented at a spray angle SA equal to or greater than 7 degrees from a plane perpendicular to the central axis of said combustion bowl.

28. An internal combustion engine as defined in claim 27, wherein SA is equal to or less than 40 degrees from a plane perpendicular to the central axis of said combustion bowl.

29. A piston as defined in claim 9, wherein the ratio of BD/L is greater than 6.2 and is less than or equal to 7.0.

30. An internal combustion engine containing at least one combustion chamber and the piston of claim 29 mounted for reciprocal movement within said combustion chamber and a fuel system for periodically injecting fuel into said combustion chamber in an spray plume which is symmetrical about a central axis that is coaxial with the central axis of said combustion bowl.

31. An internal combustion engine as defined in claim 30, wherein said fuel system includes an injection nozzle containing a plurality of orifices arranged to form said spray plume, each said orifice having a central axis oriented at a spray angle SA equal to or greater than 7 degrees from a plane perpendicular to the central axis of said combustion bowl.

32. An internal combustion engine as defined in claim 31, wherein SA is equal to or less than 40 degrees from a plane perpendicular to the central axis of said combustion bowl.

33. A piston as defined in claim 5, wherein the ratio of $R_2/R_1$ is greater than 0.14 and is less than or equal to 0.32.

34. An internal combustion engine containing at least one combustion chamber and the piston of claim 33 mounted for reciprocal movement within said combustion chamber and a fuel system for periodically injecting fuel into said combustion chamber in an spray plume which is symmetrical about a central axis that is coaxial with the central axis of said combustion bowl.

35. An internal combustion engine as defined in claim 34, wherein said fuel system includes an injection nozzle containing a plurality of orifices arranged to form said desired spray plume, each said orifice having a central axis oriented at a spray angle SA equal to or greater than 7 degrees from a plane perpendicular to the central axis of said combustion bowl.

36. An internal combustion engine as defined in claim 35, wherein SA is equal to or less than 40 degrees from a plane perpendicular to the central axis of said combustion bowl.

37. A piston as defined in claim 9, wherein the ratio of $R_2/R_1$ is greater than 0.14 and is less than or equal to 0.32.

38. An internal combustion engine containing at least one combustion chamber and the piston of claim 37 mounted for reciprocal movement within said combustion chamber and a fuel system for periodically injecting fuel into said combustion chamber in an spray plume which is symmetrical about a central axis that is coaxial with the central axis of said combustion bowl.

39. An internal combustion engine as defined in claim 38, wherein said fuel system includes an injection nozzle containing a plurality of orifices arranged to form said spray plume, each said orifice having a central axis oriented at a spray angle SA equal to or greater than 7 degrees from a plane perpendicular to the central axis of said combustion bowl.

40. An internal combustion engine as defined in claim 39, wherein SA is equal to or less than 40 degrees from a plane perpendicular to the central axis of said combustion bowl.

41. An internal combustion engine as defined in claim 39, wherein said injection nozzle includes n said orifices and wherein n is equal to or greater than 6, the hydraulic flow for each orifice at 200 psi (1.379 $MP_a$) is between 330 and 438 PPH and the diameter of each orifice is 0.127 to 0.332 mm.

42. An internal combustion engine as defined in claim 39, wherein said injection nozzle includes n said orifices and wherein n is equal to 6.

43. A piston as defined in claim 9, wherein said raised floor section has a floor diameter FD which is approximately 80 percent of BD.

44. A piston as defined in claim 9, wherein said upper face of said piston crown contains valve pockets equally spaced around the perimeter of said combustion bowl.

45. A piston as defined in claim 9, wherein said raised floor section includes a uppermost flat central section oriented orthogonally with respect to the central axis of said combustion bowl.

46. A piston as defined in claim 37, wherein the ratio of BD/L is greater than 6.2 and is less than or equal to 7.0

47. A piston as defined in claim 37, wherein the ratio of BD/CD is greater than or equal to 0.54 and is less than or equal to 0.75.

48. A piston as defined in claim 17, wherein the ratio of $BD/R_1$ is greater than or equal to 1.3 and is less than or equal to 3.4.

49. A piston as defined in claim 48, wherein the ratio of $R_2/R$, is greater than 0.14 and is less than or equal to 0.32.

50. A piston as defined in claim 25, wherein the ratio of BD/L is greater than 6.2 and is less than or equal to 7.0.

* * * * *